(12) United States Patent
Kauffman et al.

(10) Patent No.: US 11,338,898 B2
(45) Date of Patent: May 24, 2022

(54) SWING-LINK TRUNNION TRUSS MOUNT

(71) Applicant: THE BOEING COMPANY, Chicago, IL (US)

(72) Inventors: Brad A. Kauffman, Tulalip, WA (US); Thomas V. Gendzwill, Redmond, WA (US); Sergey S. Shevchenko, Moscow (RU); Ilia A. Rumyantsev, Moscow (RU)

(73) Assignee: THE BOEING COMPANY, Chicago, IL (US)

( * ) Notice: Subject to any disclaimer, the term of this patent is extended or adjusted under 35 U.S.C. 154(b) by 113 days.

(21) Appl. No.: 16/841,344

(22) Filed: Apr. 6, 2020

(65) Prior Publication Data
US 2020/0231266 A1 Jul. 23, 2020

Related U.S. Application Data

(62) Division of application No. 15/616,738, filed on Jun. 7, 2017, now Pat. No. 10,611,453.

(51) Int. Cl.
| *B64C 1/06* | (2006.01) |
| *B64C 1/18* | (2006.01) |
| *B64F 5/10* | (2017.01) |
| *E04C 3/07* | (2006.01) |
| *E04C 3/04* | (2006.01) |

(52) U.S. Cl.
CPC ............ *B64C 1/061* (2013.01); *B64C 1/18* (2013.01); *B64F 5/10* (2017.01); *E04C 3/07* (2013.01); *E04C 2003/043* (2013.01); *E04C 2003/0413* (2013.01); *E04C 2003/0465* (2013.01)

(58) Field of Classification Search
CPC ... B64C 1/061; B64C 1/18; B64F 5/10; E04C 3/07; E04C 2003/0413; E04C 2003/043; E04C 2003/0465
See application file for complete search history.

(56) References Cited

U.S. PATENT DOCUMENTS

| 6,360,509 | B1 | 3/2002 | Sluiter |
| 6,883,753 | B1 | 4/2005 | Scown |
| 7,497,638 | B2 | 3/2009 | Tubbs et al. |
| 7,637,686 | B2 | 12/2009 | Wood et al. |
| 9,649,820 | B1 * | 5/2017 | Boone ............... B29C 66/73751 |
| 2001/0042351 | A1 | 11/2001 | Keil |
| 2005/0108978 | A1 | 5/2005 | Strickland et al. |
| 2016/0129986 | A1 * | 5/2016 | Anast ...................... B64C 1/069 244/119 |
| 2016/0347436 | A1 | 12/2016 | Doran et al. |
| 2017/0211284 | A1 | 7/2017 | Nguyen et al. |
| 2018/0354601 | A1 | 12/2018 | Kauffman et al. |

* cited by examiner

*Primary Examiner* — Rodney A Bonnette
(74) *Attorney, Agent, or Firm* — Patterson + Sheridan, LLP

(57) ABSTRACT

A truss connected to a structure via a fixed rod end attachment and at least one swing-link attachment. A first beam of the truss is connected to a frame member of the structure via a fixed rod end attachment, which locates the truss relative to the frame of the structure. Remaining beams of the truss to be connected to the frame of the structure are attached via swing-link attachments, which can pivot relative to the beam of the truss and the frame of the structure to allow relative movement between the beam and frame. The relative movement allows the structure to flex without imparting additional loads in the truss or the frame of the structure.

20 Claims, 10 Drawing Sheets

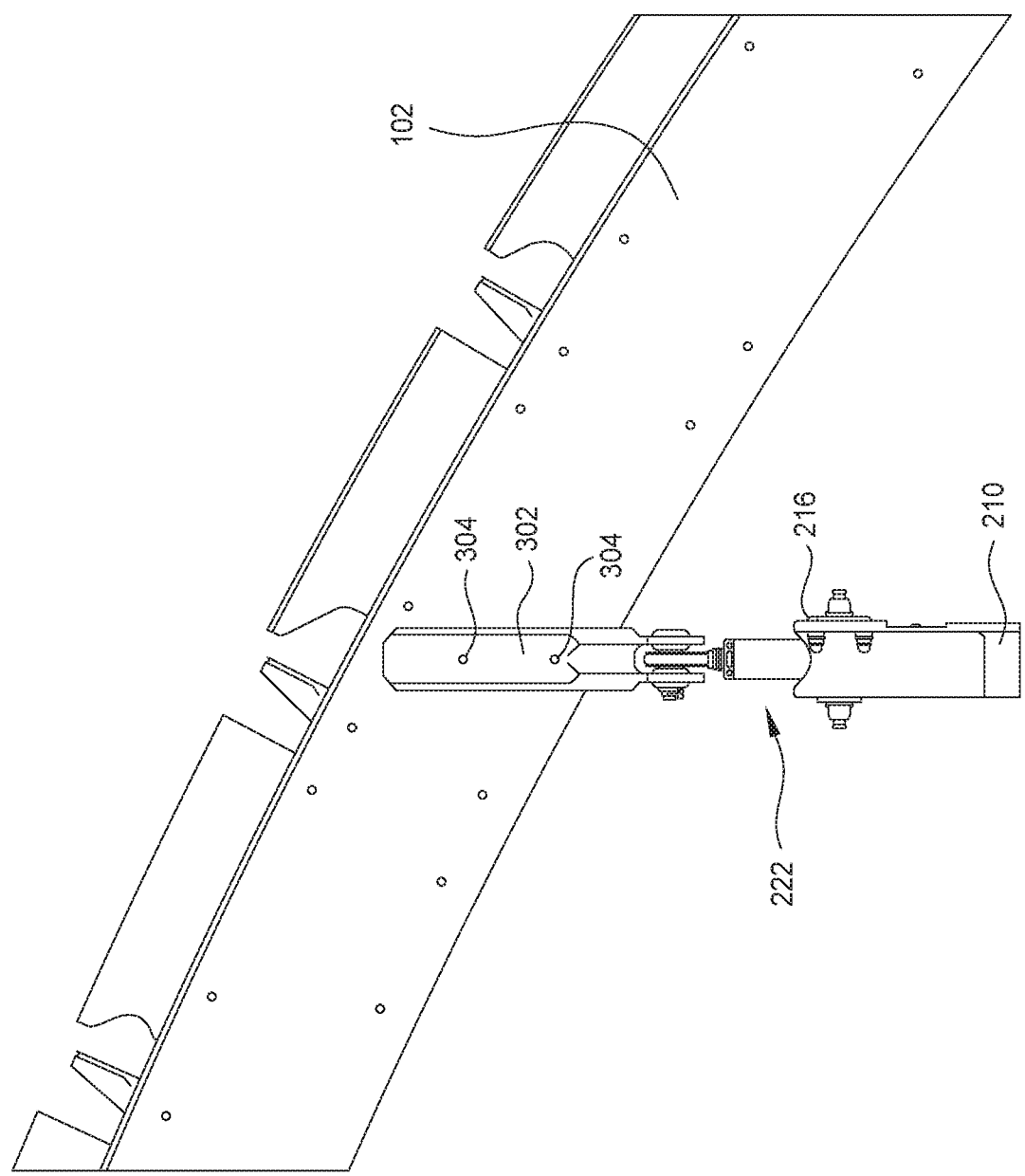

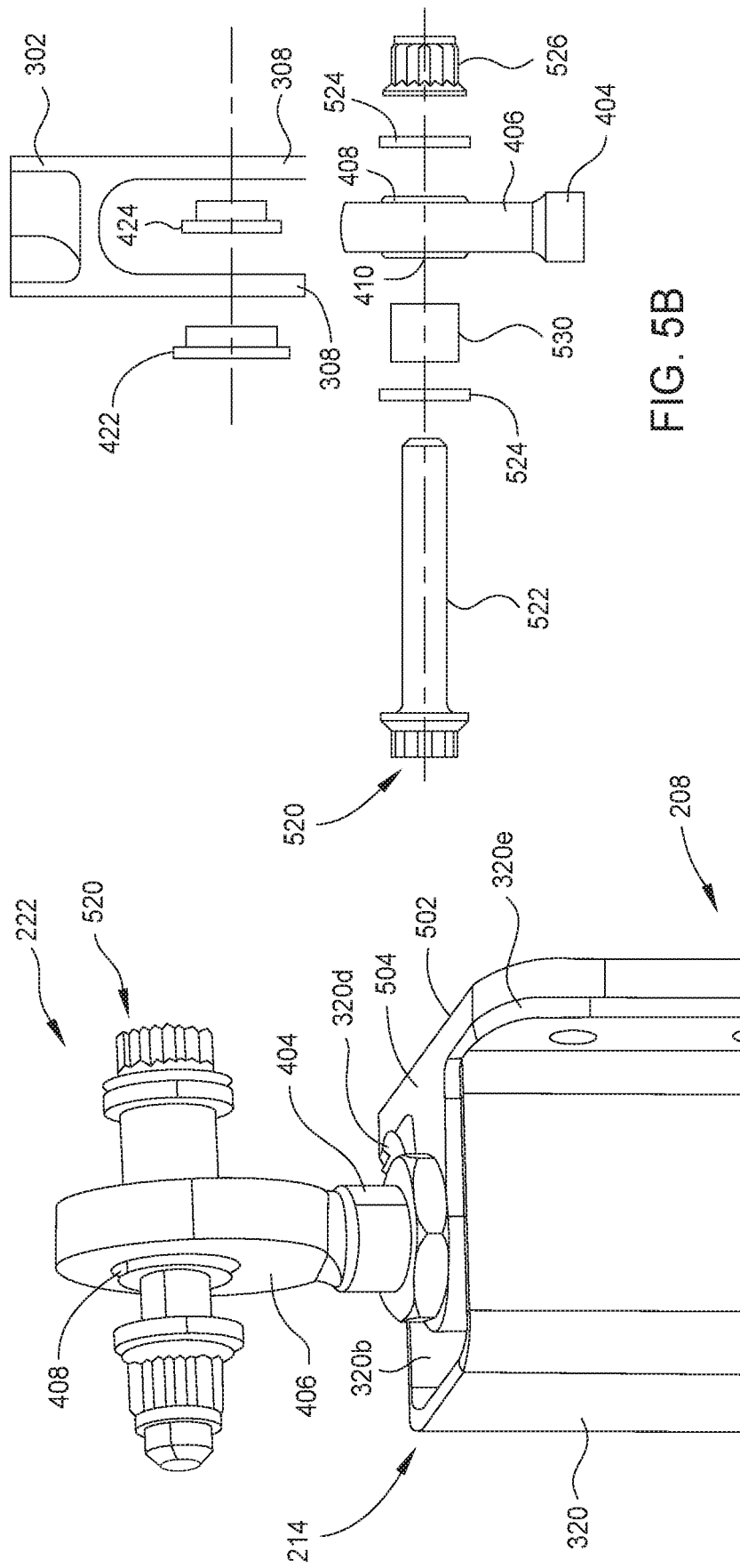

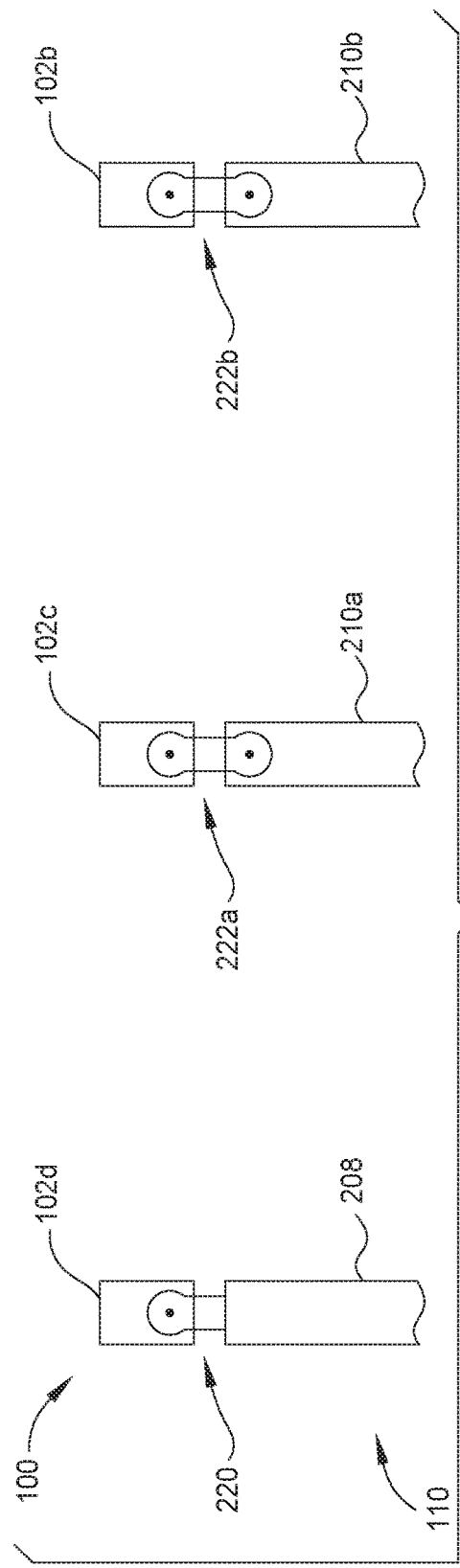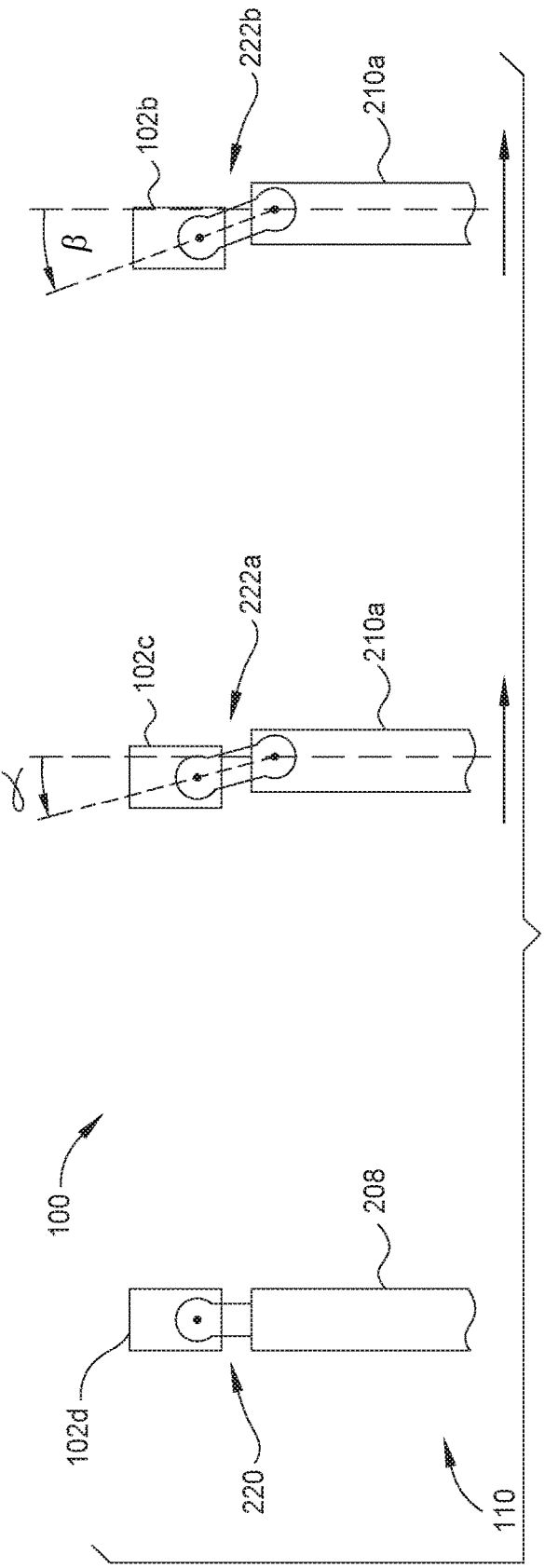

SWING-LINK TRUNNION TRUSS MOUNT

CROSS-REFERENCE TO RELATED APPLICATIONS

This application is a U.S. non-provisional patent application that is a divisional of co-pending U.S. non-provisional patent application Ser. No. 15/616,738 filed Jun. 7, 2017. The aforementioned related patent application is incorporated herein by reference in its entirety.

BACKGROUND

Truss structures can be used in vehicles, such as aircraft, boats, trucks, and buses to support loads or structures in a vehicle. In various instances, members of a truss structure are connected to structural members of the vehicle such that the truss structure could impart loads into the structure of a vehicle. For example, an airframe of an aircraft may be designed to flex when it encounters turbulence. However, a truss that is connected to the airframe could resist such flexing.

SUMMARY

According to one aspect, a truss for a structure comprises a first member and a second member oriented along a direction of a longitudinal axis. The first member is spaced apart from the second member in a first lateral direction relative to the longitudinal axis. The truss also comprises a first beam attached to the first member and the second member at a first longitudinal position along the longitudinal axis and oriented along the first lateral direction relative to the longitudinal axis. The first beam includes a first end extending past the first member in the first lateral direction and away from the second member. The truss also comprises a second beam attached to the first member and the second member at a second longitudinal position along the longitudinal axis and oriented along the first lateral direction relative to the longitudinal axis. The second beam includes a second end extending past the first member in the first lateral direction away from the second member. The truss also comprises a first fixed rod end attachment rigidly connected to the first end of the first beam, wherein the first fixed rod end attachment is configured for attachment to a first frame member of the structure. The truss also comprises a first swing-link attachment pivotably connected to the second end of the second beam. The first swing-link attachment is configured for attachment to a second frame member of the structure and allows relative movement between the second end of the second beam and the second frame member in the direction of the longitudinal axis.

According to one aspect, an aircraft comprises a fuselage that comprises a first frame member and a second frame member. The first and second frame member are spaced apart along a longitudinal axis. The aircraft also comprises a truss disposed in the fuselage. The truss comprises a first member and a second member oriented along a direction of the longitudinal axis. The first member is spaced apart from the second member in a first lateral direction relative to the longitudinal axis. The truss also comprises a first beam attached to the first member and the second member at a first longitudinal position along the longitudinal axis and oriented along the first lateral direction relative to the longitudinal axis. The first beam includes a first end extending past the first member in the first lateral direction away from the second member. The truss also comprises a second beam attached to the first member and the second member at a second longitudinal position along the longitudinal axis and oriented along the first lateral direction. The second beam includes a second end extending past the first member in the first lateral direction away from the second member. The truss also comprises a first fixed rod end attachment rigidly connected to the first end of the first beam, wherein the first fixed rod end attachment is attached to the first frame member of the fuselage. The truss also comprises a first swing-link attachment pivotably connected to the second end of the second beam. The first swing-link attachment is attached to the second frame member of the fuselage and allows relative movement between the second end of the second beam and the second frame member in the direction of the longitudinal axis.

According to one aspect, a method comprises providing an aircraft fuselage that comprises a first frame member and a second frame member, wherein the first and second frame member are spaced apart along a longitudinal axis, and wherein the aircraft fuselage includes an open end. The method further comprises transporting a truss into the fuselage through the open end of the fuselage. The truss comprises a first member and a second member oriented along the longitudinal axis. The first member is spaced apart from the second member in a first lateral direction relative to the longitudinal axis. The truss further comprises a first beam attached to the first member and the second member at a first longitudinal position along the longitudinal axis and oriented along the first lateral direction relative to the longitudinal direction. The first beam includes a first end extending past the first member in the first lateral direction away from the second member. The truss further comprises a second beam attached to the first member and the second member at a second longitudinal position along the longitudinal axis and oriented along the first lateral direction. The second beam includes a second end extending past the first member in the first lateral direction away from the second member. The truss further comprises aircraft systems equipment coupled to at least one of the first member, the second member, the first beam, and the second beam, wherein the aircraft systems equipment comprises at least one of ducts, wiring bundles, and equipment boxes. The method further comprises rigidly connecting the first end of the first beam to the first frame member with a first fixed rod end. The method further comprises pivotably connecting the second end of the second beam to the second frame member of the fuselage with a first swing-link attachment, wherein the first swing-link attachment allows relative movement between the second end of the second beam and the second frame member in the direction of the longitudinal axis.

BRIEF DESCRIPTION OF ILLUSTRATIONS

FIG. 3A is an end view of a portion of a frame member of the aircraft, wherein a swing-link attachment is coupled to a mounting plate attached to the frame member;

FIG. 5A is a perspective view of a fixed rod end connected to a truss member of the truss of FIG. 1A;

FIG. 5B is an exploded end view of the fixed rod end of FIG. 5A and fastener for coupling the fixed rod end to a mounting plate;

FIG. 6A is a schematic view of three truss members mounted to three respective vehicle frame members via a fixed rod end and two swing-link attachments;

FIG. 6B is a schematic view of three truss members mounted to three respective vehicle frame members via a fixed rod end and two swing-link attachments, wherein the two truss members mounted by swing-link attachments are deflected relative to the respective vehicle frame members.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

As discussed above, members of a truss structure are connected to structural members of the vehicle such that the truss structure could impart loads into the structure of a vehicle. For example, an airframe of an aircraft may be designed to flex when it encounters turbulence or as it maneuvers. As another example, the airframe of the aircraft may expand or contract as the outside temperature increases or decreases. However, a truss that is connected to the airframe could resist such flexing, expansion, or contraction. In aspects described herein, at least some of the members of the truss structure are connected to structural members of the vehicle via swing-link attachments, which allow relative movement between the members of the truss structure and the structural members of the vehicle. The relative movement allows the vehicle structure to flex, expand, or contract as designed without the structure of the truss imparting additional, unintended loads on the vehicle structure.

Figure 1B:
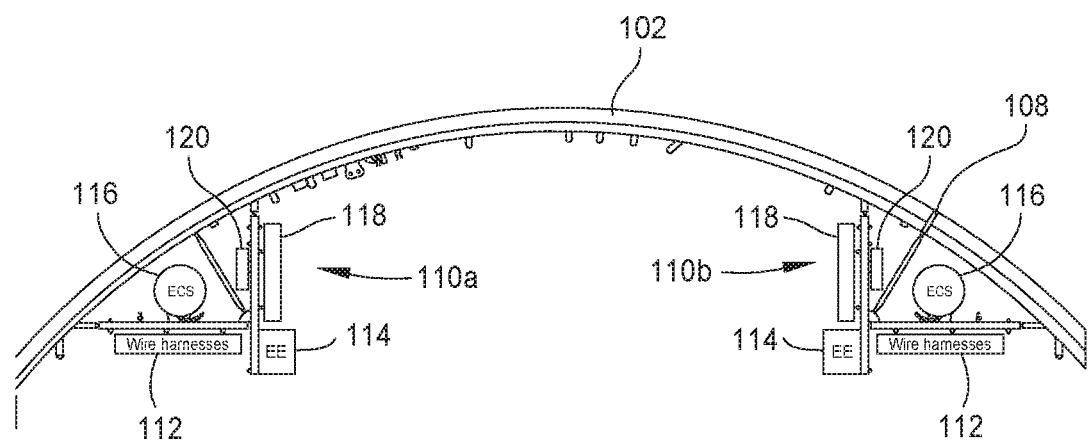
FIG. 1B is a detail end view of the two truss structures of FIG. 1A.
Figure 1A:
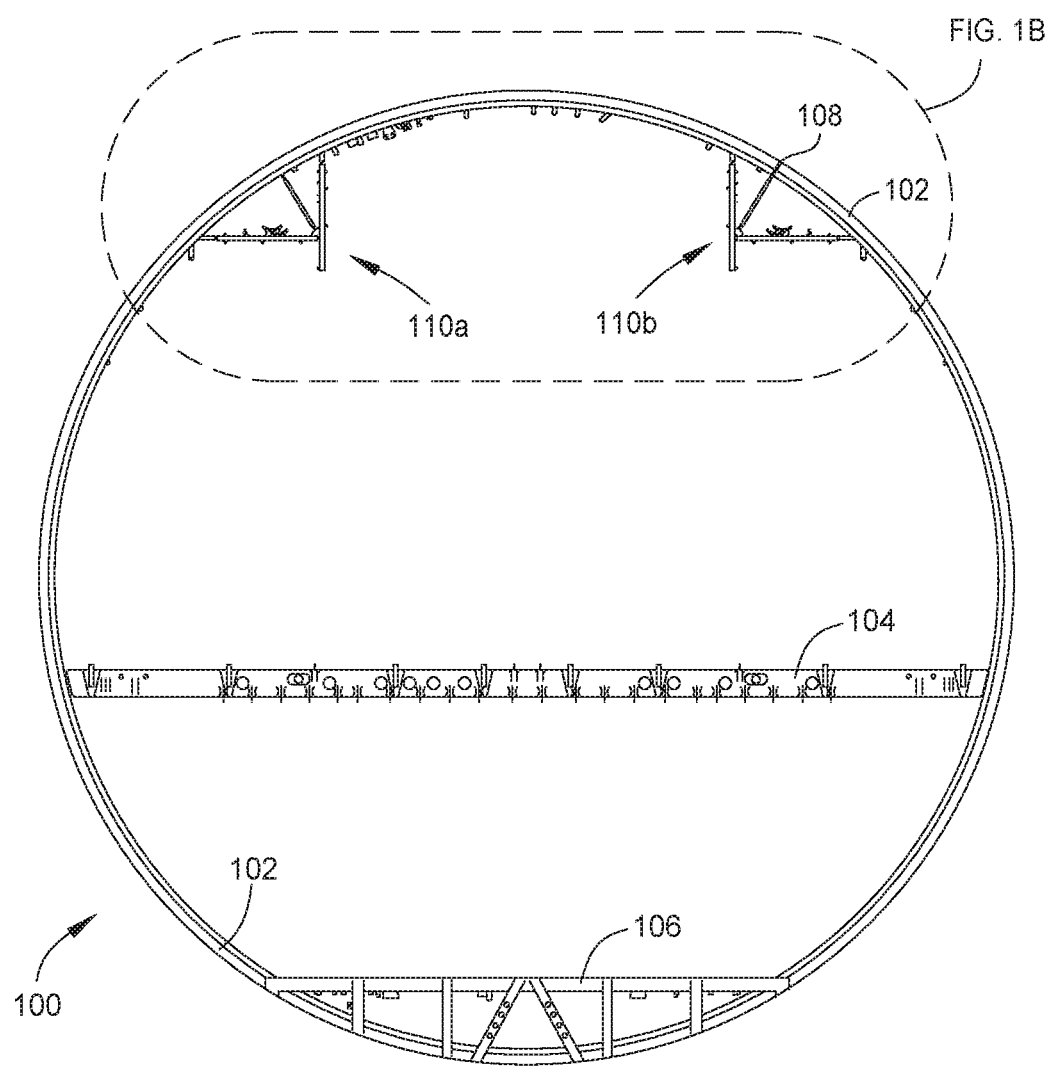
FIG. 1A is an end view of structural elements of a commercial aircraft, wherein two truss structures are attached to frame members of the aircraft via swing-link attachments.

FIG. 1A is an end view of structural members of an aircraft 100. The structural members include circumferential frame members 102 that define an outer periphery of a fuselage of the aircraft 100, cabin floor frame members 104 that define a passenger cabin floor of the aircraft 100, and cargo floor frame members 106 that define a cargo hold floor of the aircraft 100. The aircraft 100 includes two trusses 110 attached to the circumferential frame members 102: a first truss 110a and a second truss 110b.

FIG. 1B is an end view of the trusses 110a and 110b in greater detail. The trusses 110a and 110b support several different aircraft systems. For example, in the illustrated aspect, wire harnesses 112, electrical equipment (EE) 114, environmental control system (ECS) ducts 116, and various other equipment (e.g., 118 and 120) is supported by the trusses.

Figure 2A:
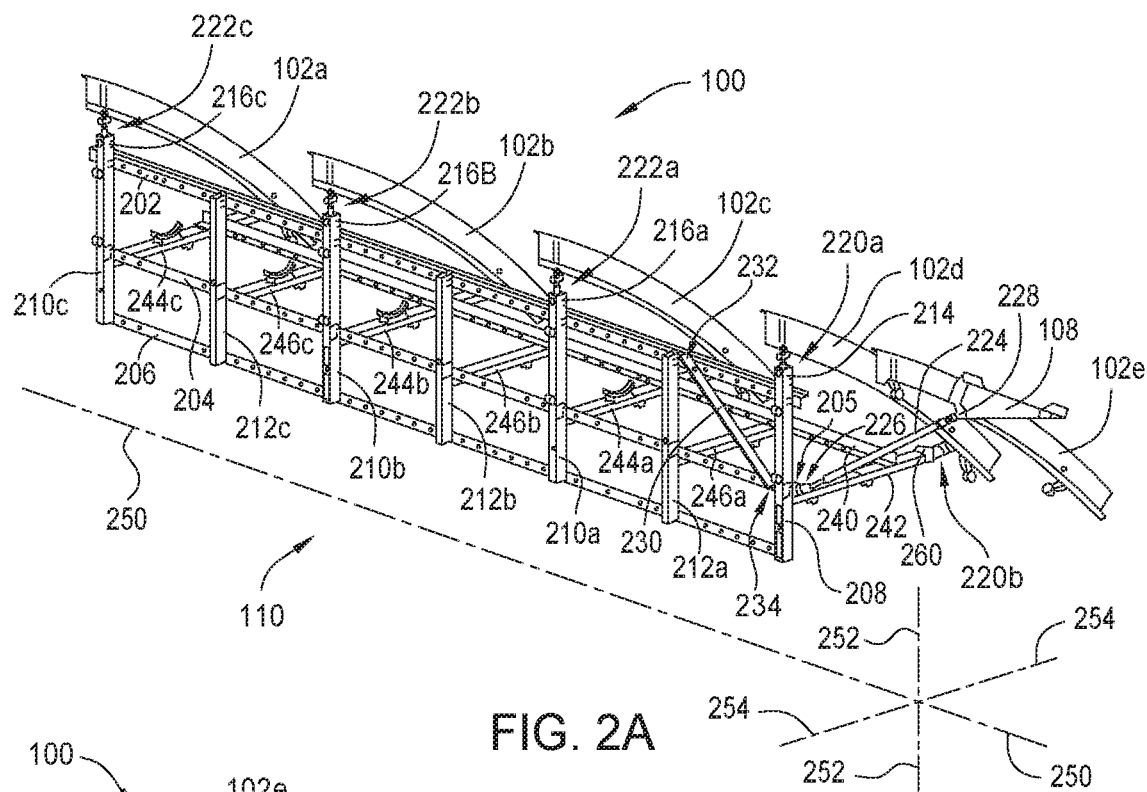
FIG. 2A is an outward-facing perspective view of the truss structure of FIG. 1A attached to frame members of the aircraft.
Figure 2B:
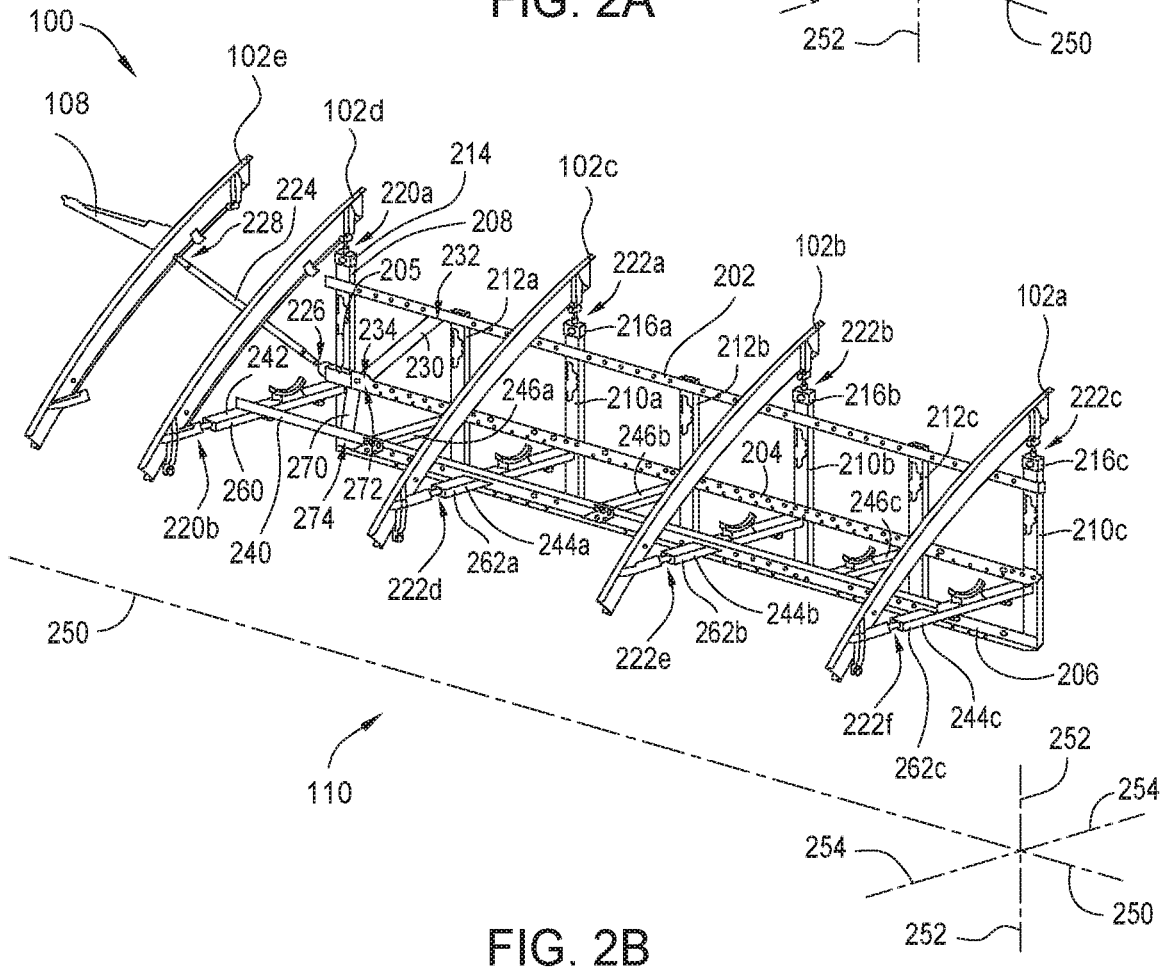
FIG. 2B is an inward-facing perspective view of the truss structure of FIG. 1A attached to frame members of the aircraft.

FIGS. 2A and 2B are an outward-facing perspective view and an inward-facing perspective view, respectively, of one of the trusses 110. The truss 110 includes a first member 202 and a second member 204 oriented along a longitudinal axis 250. The first member is spaced apart from the second member 204 in a first lateral direction 252 relative to the longitudinal axis 250. In the illustrated aspect, the longitudinal axis 250 is arranged in a horizontal plane and the first lateral direction 252 is arranged vertically and orthogonal to the longitudinal axis 250. The truss 110 also includes a first beam 208 attached to the first member 202 and the second member 204, and oriented along the first lateral direction 252. The first beam 208 is positioned at a first longitudinal position along the longitudinal axis 250 that aligns with a first frame member 102d (e.g., a circumferential frame member) of the aircraft 100. The first beam 208 includes a first end 214 extending past the first member 202 in the first lateral direction 252 and away from the second member 204. In the illustrated aspect, the first end 214 extends vertically above the first member 202.

The truss 110 also includes a second beam 210a attached to the first member 202 and the second member 204, and oriented along the first lateral direction 252. The second beam 210a is positioned at a second longitudinal position along the longitudinal axis 250 that aligns with a second frame member 102c (e.g., a circumferential frame member) of the aircraft 100. The second beam 210a includes a second end 216a extending past the first member 202 in the first lateral direction 252 and away from the second member 204. In the illustrated aspect, the second end 216a extends vertically above the first member 202. In the illustrated aspect, the truss 110 includes a third beam 210b and a fourth beam 210c that are also attached to the first member 202 and the second member 204, and oriented along the first lateral direction 252. The third beam 210b and the fourth beam 210c are positioned at third and fourth longitudinal positions, respectively, along the longitudinal axis 250 that align with respective third and fourth frame members 102b and 102a (e.g., circumferential frame members), respectively, of the aircraft 100. In various aspects, the truss 110 may have more or fewer beams 210, depending on a length of the truss 110 in a direction along the longitudinal axis 250.

Optionally, the truss 110 includes supplemental beams 212 attached to the first member 202 and the second member 204, oriented along the first lateral direction 252, and positioned between adjacent ones of the first beam 208 and the second beam 210a, the third beam 210b, and the fourth beam 210c. For example, in the illustrated aspect, the truss 110 includes a first supplemental beam 212a that is positioned at a longitudinal position along the longitudinal axis 250 that is between the first beam 208 and the second beam 210a. The truss 110 also includes a second supplemental beam 212b that is positioned at a longitudinal position along the longitudinal axis 250 that is between the second beam 210a and the third beam 210b. The truss 110 also includes a third supplemental beam 212c that is positioned at a longitudinal position along the longitudinal axis 250 that is between the third beam 210b and the third beam 210c. The supplemental beams 212 are not connected to circumferential frame members 102 of the aircraft 100. The supplemental beams 212 provide additional structural support to the truss 110.

The first beam 208 of the truss 110 is connected to the first frame member 102d with which it is aligned by a fixed rod end attachment 220a (discussed in greater detail below with reference to FIGS. 5A and 5B). The fixed rod end attachment 220a allows the first beam 208 to pivot about the fixed rod end attachment 220a relative to the first frame member 102d. However, the fixed rod end attachment 220a does not allow the first end 214 of the first beam 208 to translate relative to the first frame member 102d. Allowing the first beam 208 to pivot relative to the first frame member 102d prevents the application of a moment force from the truss 110 to the first frame member 102d or vice versa. The second beam 210a, third beam 210b, and fourth beam 210c are connected to the frame members 102c, 102b, and 102a, respectively, by first, second, and third swing-link attachments 222a, 222b, and 222c (discussed in greater detail below with reference to FIGS. 3A-3E and 4A-4D). The first, second, and third swing-link attachments 222a, 222b, and 222c allow the respective second beam 210a, third beam 210b, and fourth beam 210c to pivot about the respective first, second, and third swing-link attachments 222a, 222b, and 222c relative to the first frame member 102d in a plane defined by the longitudinal axis 250 and the first lateral direction 252). The first, second, and third swing-link attachments 222a, 222b, and 222c also allow the respective second beam 210a, third beam 210b, and fourth beam 210c to translate relative to the circumferential frame members 102 in a direction along the longitudinal axis 250.

In at least one aspect, the truss 110 also includes a third member 240 that is oriented along the longitudinal axis 250 and spaced apart from the second member 204 in a second lateral direction 254 relative to the longitudinal axis 250. In the illustrated aspect, the second lateral direction 254 is arranged horizontally and orthogonally relative to the longitudinal axis 250 and the first lateral direction 252. The truss 110 also includes a fifth beam 242 attached to the second member 204 and the third member 240, and oriented along the second lateral direction 254. The fifth beam 242 is positioned at the first longitudinal position along the longitudinal axis 250 that aligns with the first frame member 102d of the aircraft 100. The fifth beam 242 includes a fifth end 260 extending past the third member 240 in the second lateral direction 254 and away from the second member 204. In the illustrated aspect, the fifth end 260 extends horizontally past the third member 240 toward the first frame member 102d.

The truss 110 also includes a sixth beam 244a attached to the second member 204 and the third member 240, and oriented along the second lateral direction 254. The sixth beam 244a is positioned at the second longitudinal position along the longitudinal axis 250 that aligns with the second frame member 102c of the aircraft 100. The sixth beam 244a includes a sixth end 262a extending past the third member 240 in the second lateral direction 254 and away from the second member 204. In the illustrated aspect, the sixth end 262a extends horizontally toward the second frame member 102c. In the illustrated aspect, the truss 110 also includes a seventh beam 244b and an eighth beam 244c that are also attached to the second member 204 and the third member 240, and oriented along the second lateral direction 254. The seventh beam 244b and the eighth beam 244c are positioned at the third and fourth longitudinal positions, respectively, along the longitudinal axis 250 that align with respective third and fourth frame members 102b and 102a of the aircraft 100. In various aspects, the truss 110 may have more or fewer beams 244, depending on a length of the truss 110 in a direction along the longitudinal axis 250.

The fifth beam 242 of the truss 110 is connected to the first frame member 102d with which it is aligned by a fixed rod end attachment 220b (discussed in greater detail below with reference to FIGS. 5A and 5B). The fixed rod end attachment 220b allows the fifth beam 242 to pivot about the fixed rod end attachment 220b relative to the first frame member 102d. However, the fixed rod end attachment 220b does not allow the fifth end 260 of the fifth beam 242 to translate relative to the first frame member 102d. Allowing the fifth beam 242 to pivot relative to the first frame member 102d prevents the application of a moment force from the truss 110 to the first frame member 102d or vice versa. The sixth beam 244a, seventh beam 244b, and eighth beam 244c are connected to the frame members 102c, 102b, and 102a, respectively, by fourth, fifth, and sixth swing-link attachments 222d, 222e, and 222f (discussed in greater detail below with reference to FIGS. 3A-3E and 4A-4D). The fourth, fifth, and sixth swing-link attachments 222d, 222e, and 222f allow the respective sixth beam 244a, seventh beam 244b, and eighth beam 244c to pivot about the respective fourth, fifth, and sixth swing-link attachments 222d, 222e, and 222f relative to the frame members 102c, 102b, and 102a in a plane defined by the longitudinal axis 250 and the second lateral direction 254). The fourth, fifth, and sixth swing-link attachments 222d, 222e, and 222f also allow the respective sixth beam 244a, seventh beam 244b, and eighth beam 244c to translate relative to the circumferential frame members 102 in a direction along the longitudinal axis 250.

Optionally, the truss 110 includes supplemental beams 246 attached to the second member 204 and the third member 240, oriented along the second lateral direction 254, and positioned between adjacent ones of the fifth beam 242 and the sixth, seventh, and eighth beams 244a, 244b, and 244c. For example, in the illustrated aspect, the truss 110 includes a fourth supplemental beam 246a that is positioned at the same longitudinal position along the longitudinal axis 250 as the first supplemental beam 212a, and that is between the fifth beam 242 and the sixth beam 244a. The truss 110 also includes a fifth supplemental beam 246b that is positioned at the same longitudinal position along the longitudinal axis 250 as the second supplemental beam 212b, and that is between the sixth beam 244a and the seventh beam 244b. The truss 110 also includes a sixth supplemental beam 246c that is positioned at the longitudinal position along the longitudinal axis 250 as the third supplemental beam 212c, and that is between the seventh beam 244b and the eighth beam 244c. The supplemental beams 246 are not connected to circumferential frame members 102 of the aircraft 100. The supplemental frame members 246 provide additional structural support to the truss 110.

As illustrated in FIGS. 2A and 2B, in at least one aspect, the truss 110 includes a fourth member 206 oriented along the longitudinal axis 250 and spaced apart from the second member 204 in the first lateral direction 252. In the illustrated aspect, the fourth member 206 is spaced below the second member 204. As illustrated in FIG. 1B, the fourth member 206 can support some of the systems attached to the truss 110. For example, in FIG. 1B, the electrical equipment is at least partially supported by the fourth member 206. In aspects that include the third member 206, the first beam 208, second beam 210a, third beam 210b, fourth beam 210c, and supplemental beams 212 extend below the second member 204 to support the third member 206.

As illustrated in FIGS. 2A and 2B, in at least one aspect, the truss 110 includes one or more diagonal members connected to the first member 202 and the second member 204 and/or to the second member 204 and the third member 240. FIGS. 2A and 2B illustrate a first diagonal member 230 that has a first end 232 connected to the first member 202 and a second end 234 connected to the second member 204. The first diagonal member 230 forms non-orthogonal and non-parallel angles with the first member 202 and the second member 204. The first diagonal member 230 provides additional structural support to the first member 202 and the second member 204, preventing relative motion there-between in the direction along the longitudinal axis 250. FIGS. 2A and 2B also illustrate a second diagonal member 270 that has a third end 272 connected to the second member 204 and a fourth end 274 connected to the third member 240. The second diagonal member 270 forms non-orthogonal and non-parallel angles with the second member 204 and the third member 240. The second diagonal member 270 provides additional structural support to the second member 204 and the third member 240, preventing relative motion there-between in the direction along the longitudinal axis 250.

Optionally, the truss 110 includes a strut 224 that connects the truss 110 to additional frame members of the aircraft 100. In the aspect illustrated in FIGS. 2A and 2B, a first end 226 of the strut 224 is connected to an end 205 of the second member 204 and a second end 228 of the strut 224 is connected to another frame member 108 (e.g., an intercostal frame member) of the aircraft 100. The another frame member 108 is disposed between adjacent circumferential frame members 102 of the aircraft 100. For example, in the illustrated aspect in FIGS. 2A and 2B, the another frame member 108 is connected to a fifth circumferential frame member 102e and may be connected to a sixth circumferential frame member. The strut 224 provides additional structural rigidity to the truss 110 by resisting motion of the second member 204 relative to the aircraft 100 and the first member 202 of the truss 110 in the direction of the longitudinal axis 250. As shown in FIGS. 2A and 2B, in at least one aspect, the strut 224 is arranged in a plane that is between a first plane defined by the first member 202 and the second member 204 and a second plane defined by the second member 204 and the third member 240. Stated differently, the strut 224 is oriented at non-orthogonal and non-parallel angles relative to the first lateral direction 252 and the second lateral direction 254. As a result, the strut 224 resists motion of the second member 204 relative to the aircraft 100 in the direction of the second lateral direction 254.

Figure 3D:
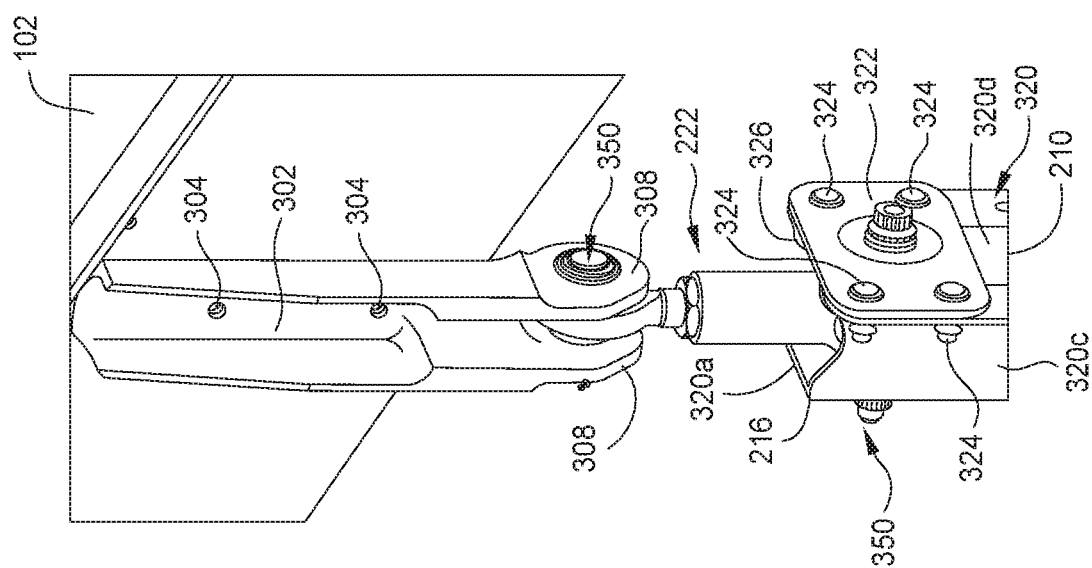
FIG. 3D is a detail perspective view of the swing-link attachment and mounting plate of FIG. 3A, wherein the swing-link attachment is connected to a truss member of the truss of FIG. 1A.
Figure 3C:
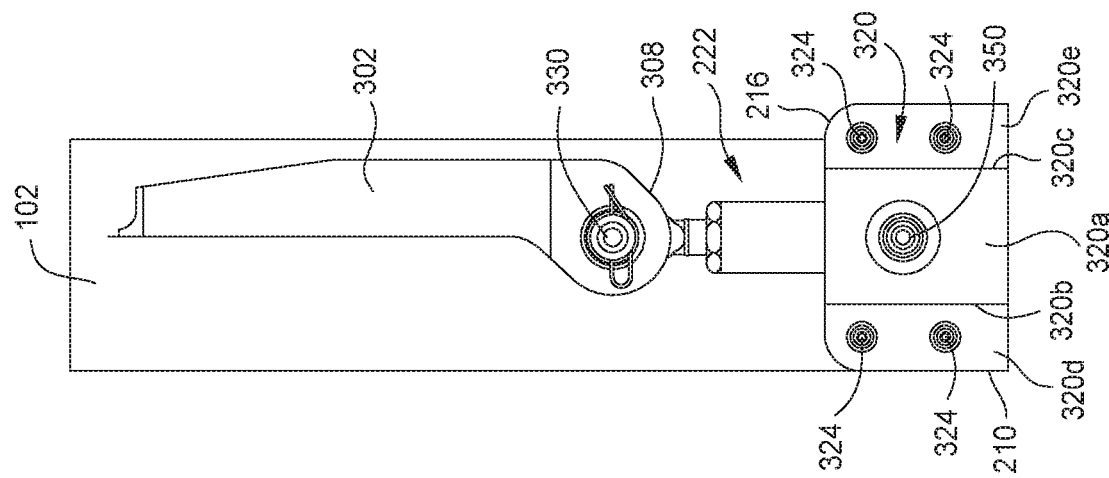
FIG. 3C is a detail side view of the swing-link attachment and mounting plate of FIG. 3A, wherein the swing-link attachment is connected to a truss member of the truss of FIG. 1A.
Figure 3B:
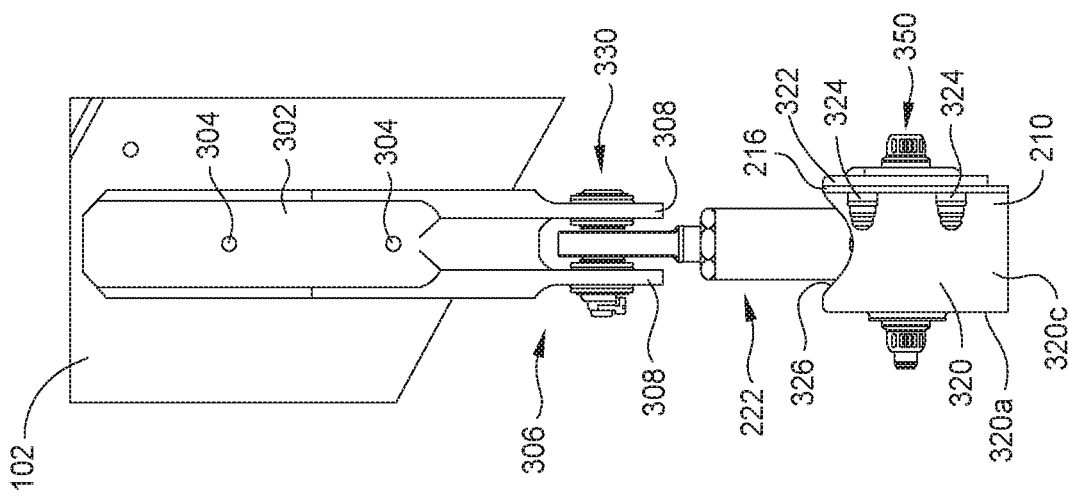
FIG. 3B is a detail end view of the swing-link attachment and mounting plate of FIG. 3A, wherein the swing-link attachment is connected to a truss member of the truss of FIG. 1A.
Figure 3E:
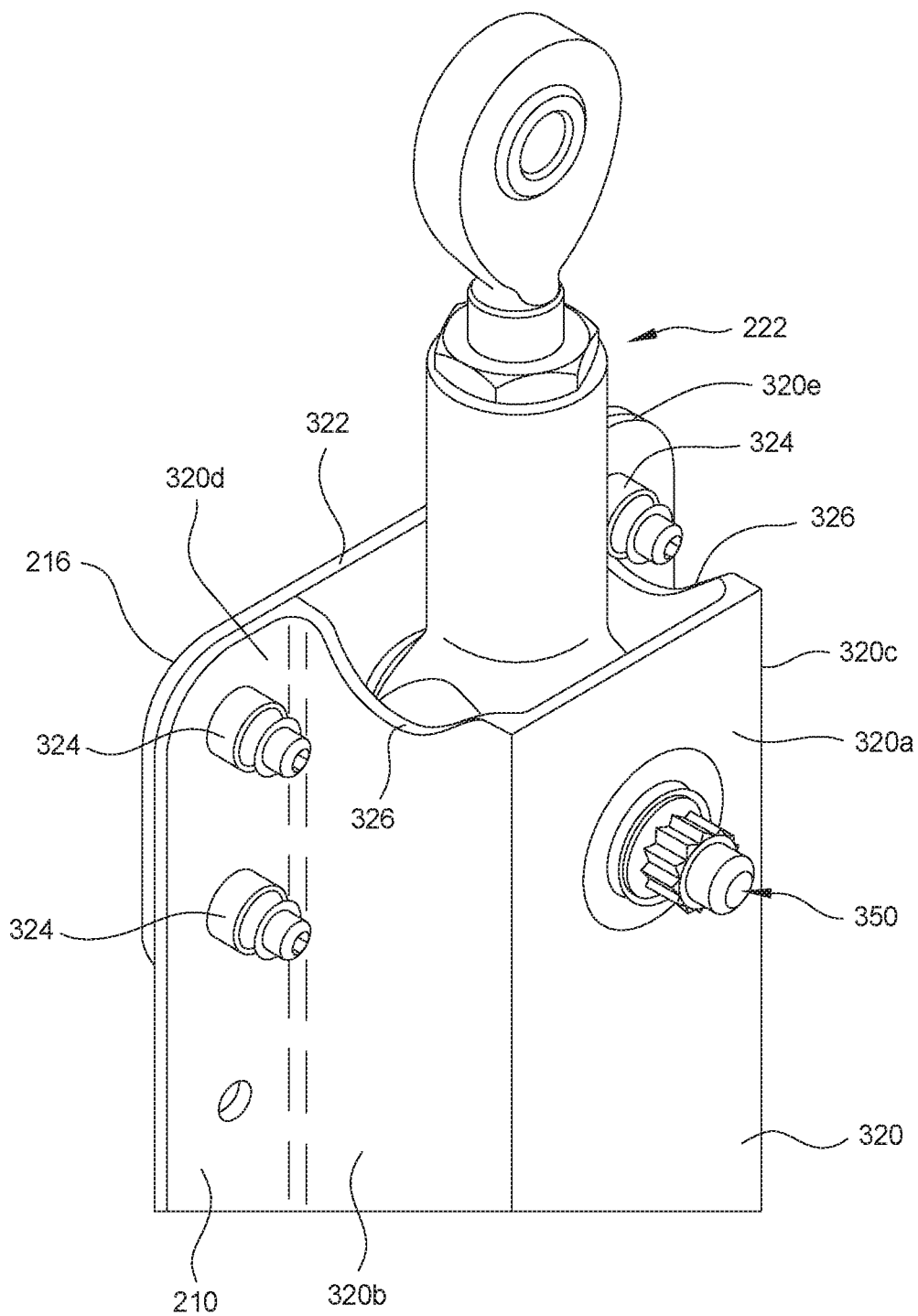
FIG. 3E is a detail perspective view of the swing-link attachment of FIG. 3A coupled to a truss member of the truss of FIGS. 1A and 1B, wherein the swing-link attachment is connected to a truss member of the truss of FIG. 1A.

FIGS. 3A-3E and 4A-4D illustrate a swing-link attachment 222, according to one aspect, coupled to a beam 210 or 244 to the circumferential frame members 102. FIGS. 3A-3D illustrate one of vertical beams (e.g., beams 210), but the illustration and explanation herein are also applicable to the horizontal beams (e.g., beams 244). FIG. 3A illustrates a mounting plate 302 attached to a circumferential frame member 102 via fasteners 304, such as rivets or bolts. Alternatively, the mounting plate could be attached to the circumferential frame member 102 via an adhesive or via welding. The swing-link attachment 222 is coupled to the mounting plate 302 and to the end 216 of the beam 210.

Figure 4A:
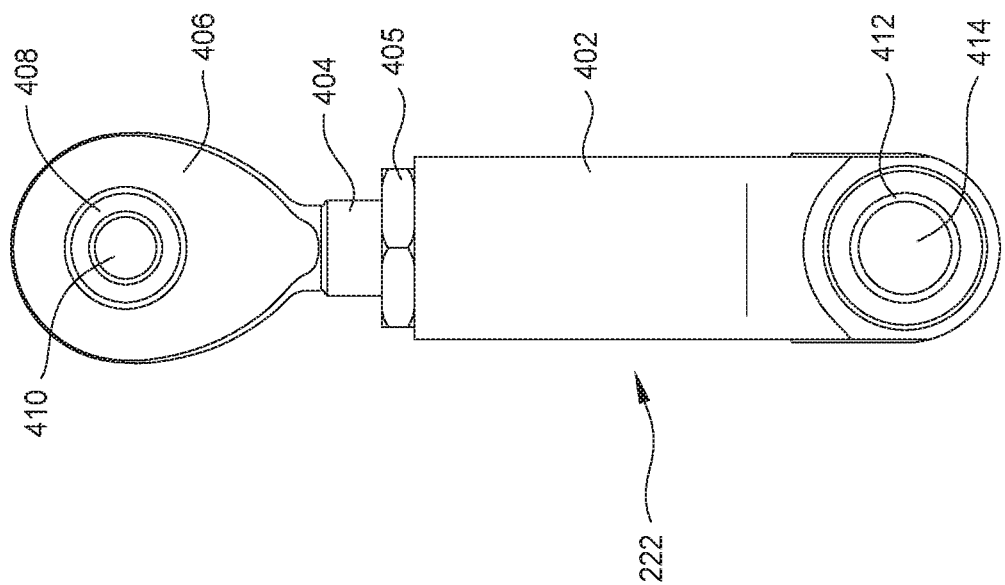
FIG. 4A is an end view of the swing-link attachment of FIG. 3A.
Figure 4B:
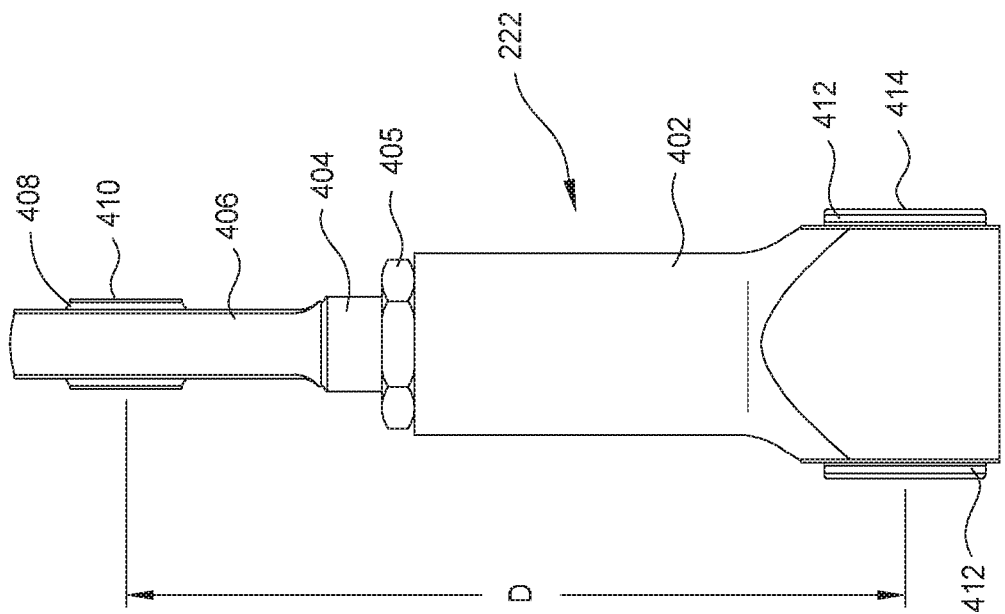
FIG. 4B is a side view of the swing-link attachment of FIG. 3A.
Figure 4D:
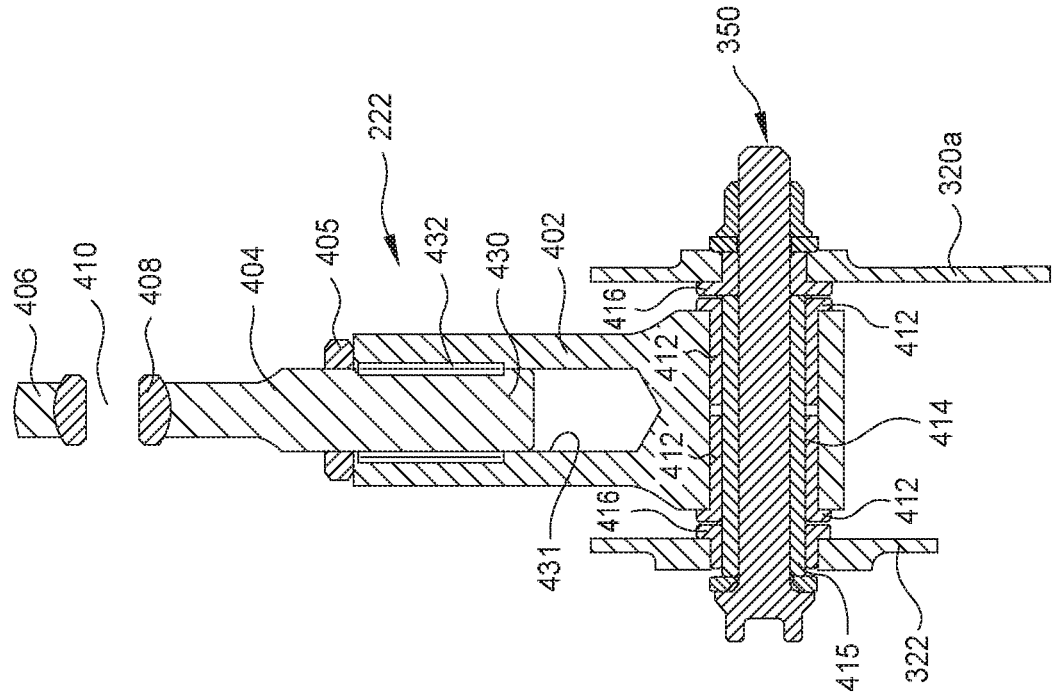
FIG. 4D is a cross-sectional end view of the swing-link attachment of FIG. 3A coupled to the truss member of FIG. 3B.

Referring primarily to the aspect illustrated in FIGS. 3B-3E, the beam 210 comprises a hat beam 320. The hat beam 320 comprises a U-channel formed by a base 320a and sides 320b and 320c extending from opposing edges of the base 320a. The hat beam 320 includes outward-projecting flanges 320d and 320e extending from edges of the respective sides 320b and 320c such that the cross-sectional profile of the hat beam 320 looks like a top hat. The end 216 of the beam 210 includes a plate 322 attached to the outward-projecting flanges 320d and 320e of the hat beam 320 via fasteners 324 (e.g., bolts or rivets). The plate 322 and hat beam 320 form an enclosure that houses a swing link (402 in FIGS. 4A and 4B) of the swing-link attachment 222. The swing link 402 includes a bushing 412 that defines a hole 414 there-through. Referring primarily to FIG. 4D, a fastener 350 (e.g., a bolt) passes through the plate 322, the hole 414 in the swing link 402, and the base 320a of the hat beam 320 to secure the swing link 402 in the enclosure at the end 216 of the beam 210. Optionally, holes in the plate 322 and the base 320a of the hat beam 320 may include additional bushings 416. Moreover, optionally, an additional bushing 415 may be disposed between a shank of the fastener 350 and the bushings 412 in the swing link 402 and the bushings 416 in the holes of the plate 322 and the base 320a of the hat beam 320. Moreover, the swing link 402 can pivot relative to the beam 210 about the fastener 350. The sides 320b and 320c of the hat beam 320 include cut outs 326 to provide clearance for the swing link 420 to pivot about the fastener 350 without contacting with the sides 320b and 320c.

Figure 4C:
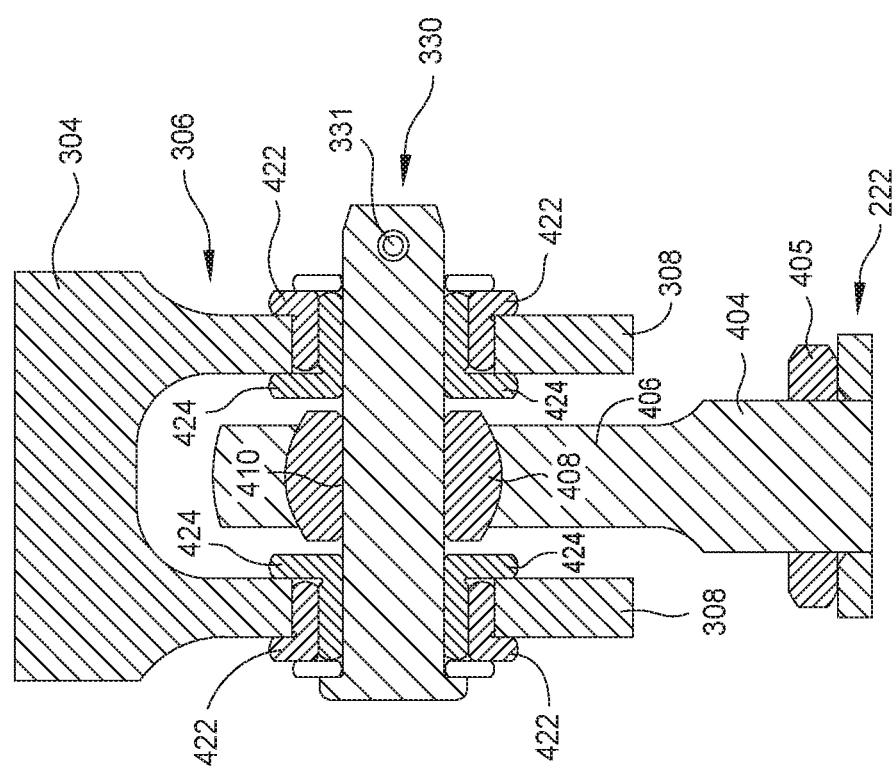
FIG. 4C is a cross-sectional end view of the swing-link attachment of FIG. 3A coupled to the mounting plate of FIG. 3A.

The swing-link attachment 222 also includes a rod end 404 attached to the swing link 402. The rod end 404 includes a flat end 406 configured to engage a clevis end 306 of the mounting plate 302. The clevis end 306 includes clevis plates 308 arranged in a spaced apart manner, and the flat end 406 of the rod end 404 is sized to fit between the clevis plates 308. The flat end 406 of the rod end 404 includes a monoball bearing 408 that defines a hole 410 there-through. Referring primarily to FIG. 4C, the rod end is secured between the clevis plates 308 by a fastener 330 (e.g., a pin) that passes through holes in the clevis plates 308 and the hole 410 through the monoball bearing 408. Optionally, the holes in the clevis plate 308 include bushings 422 and 424. The fastener 330 may be held in place by a cotter pin 331 or other retention feature. The monoball bearing 408 allows the rod end 404 to pivot about the fastener 330 relative to the mounting plate 302 (and the circumferential frame member 102). Additionally, the monoball bearing 408 enables the rod end 404 to pivot laterally (i.e., toward one clevis plate 308 or the other clevis plate 308 as shown in FIG. 4C). Such lateral pivoting allows for an amount of angular displacement of the beam 210 relative to the mounting plate 302.

Referring primarily to FIG. 4D, the rod end 404 includes an externally-threaded portion 430 that engages an internally-threaded portion 431 of the swing link 402. Such threading engagement 432 connects the rod end 404 to the swing link 402. Moreover, and referring primarily to FIG. 4A, by adjusting an amount of threading engagement 432, a distance D between the a center of the hole 414 in the swing link 402 and a center of the hole 410 in the rod end 404 can be adjusted. Stated differently, the swing link 402 and the rod end 404 can be rotated relative to one another to increase or decrease the amount of threading engagement 432 and thereby change the distance D. The distance D may be adjusted to change a distance between the mounting plate 302 and the end 216 of the beam 210. As another example, the distance D may be adjusted to accommodate a given distance between the mounting plate 302 and the end 216 of the beam 210. For example, manufacturing tolerances may result in slight variations in a distance between a mounting plate 302 and the end 216 of a beam 210 aligned with that mounting plate 302. The amounts of threading engagement 432 of the swing-link attachments 222 could be individually adjusted to accommodate these slight variations. After the amount of threading engagement 432 between the rod end 404 and the swing link 402 is suitably adjusted, a jam nut 405 can be tightened to prevent further changes to the amount of threading engagement 432.

FIGS. 5A and 5B are a perspective view of a fixed rod end attachment 220 attached to an end of a beam and an exploded view of a fastener and bushings that connect the fixed rod end attachment 220 to a mounting plate 302 attached to a circumferential frame member 102, respectively. FIG. 5A illustrates the vertical beam (e.g., beam 208 or beam 210), but the illustration and explanation herein are also applicable to the horizontal beam (e.g., beam 242 or beam 244). The beam 208 comprises a hat beam 320. A mounting plate 502 is connected to the outward-projecting flanges 320d and 320e of the hat beam 320. The mounting plate 502 includes a lug 504 projecting into a space between the sides 320b and 320c of the hat beam 320. The lug 504 includes a threaded hole, and a rod end 404 is threadingly engaged in the hole. Referring to FIG. 5B, in the illustrated aspect, the rod end 404 is attached to the mounting plate 302 via a fastener 520. The fastener 520 is inserted through the hole 410 in the monoball bearing 408. Optionally, a bushing 530 is inserted into the hole 410 in the monoball bearing 408, and the fastener 520 is inserted through the bushing 530. The fastener 520 also passes through holes in the clevis plates 308 of the mounting plate 302. Optionally, bushings 422 and 424 are inserted into the holes in the clevis plates 308, and the fastener 520 is inserted through the bushings 422 and 424. The fastener 520 in this aspect includes a threaded shank 522 that engages with a threaded nut 526 to secure the fastener 520 in the clevis plates 308 and the rod end 404. Optionally, washers 524 can be placed between the rod end 404 and the fastener 520 and nut 526.

FIGS. 6A and 6B are schematic views of a truss that illustrate how the fixed rod end attachment 220 and swing-link attachment(s) 222 operate in concert to support a truss 110 without imparting loads to circumferential frame members 102 of an aircraft 100. FIG. 6A is a schematic view of a truss 110 that includes a first beam 208 with a fixed rod end attachment 220 and a second and third beam 210a and 210b with respective swing-link attachments 222a and 222b, respectively. In FIG. 6A, the first beam 208, second beam 210a, and third beam 210b are aligned with respective frame members 102d, 102c, and 102b. In FIG. 6B, the truss 110 has deflected relative to the aircraft 100 or the aircraft 100 has deflected relative to the truss 110. For example, in turbulent conditions, the aircraft 100 may flex, causing adjacent circumferential frame members 102 to move closer together or further apart. In the illustrated example in FIG. 6B, the circumferential frame members 102 have moved closer together. Because the fixed rod end attachment 220 is rigidly attached to the end of the first beam 208, the first beam 208 is still aligned with the first frame member 102d. As a result, the fixed rod end attachment 220 locates the truss 110 relative to the first frame member 102d. By contrast, the second beam 210a is out of alignment with the second frame member 102c by a first amount and the third beam 210b is out of alignment with the third frame member 102b by a second, greater amount. As a result, the swing-link attachments 222a and 222b have pivoted relative to the respective beams 210 and circumferential frame members 102. The first swing-link attachment 222a has pivoted by a first angle α and the second swing-link attachment 222b has pivoted by a second angle β, which is greater than the first angle α.

As discussed above, by allowing the positions of the beams 210 to shift relative to the circumferential frame members 102 to which they are attached via swing-link attachments 222, forces that cause the aircraft 100 to flex (e.g., forces due to turbulence or landing forces) are not imparted to the truss 110 and vice versa. Where the aircraft 100 is designed to flex under certain loads, allowing the structural rigidity provided by the truss 110 to affect such flexing may be undesirable. Moreover, different aircraft configurations may have different truss configurations and/or lengths, resulting in different stiffnesses that could affect the aircraft 100 in different manners. By decoupling the truss 110 from the circumferential frame members 102 of the aircraft 100, the structure of the aircraft 100 can remain the same, even though different trusses 110 may be used.

The swing-link attachments 222 between the truss 110 and the aircraft 100 can also result in improved aircraft assembly practices. In instances in which a truss is rigidly mounted to the frame of the aircraft (e.g., in which a truss is not connected to the aircraft frame via swing-link attachments 222), the truss is typically assembled within the aircraft. To account for minor variances that occur due to manufacturing tolerances, such a truss is entirely assembled first with the fasteners only loosely connected. As a result, the alignment of the various pieces of the truss relative to the frame of the aircraft may be adjusted to accommodate any locations where there may be a slight misalignment between matching fastener holes of the truss and aircraft frame. The fasteners for the truss are only tightened after all the fasteners are in place. As a consequence, the truss is assembled within the aircraft, and the systems attached to the truss (e.g., wire harnesses 112, electrical equipment 114, ECS ducts 116, and various other systems 118 and 120) are installed after the truss is assembled in the aircraft. As shown in FIG. 1A, such installations may be difficult because the truss is generally located toward the top of the aircraft, and installation personnel are working over their heads to install such equipment. Additionally, the installation of the truss and systems attached to the truss add time to the assembly schedule for the aircraft.

By decoupling the truss 110 from the circumferential frame members 102 of the aircraft 100, minor variances in the circumferential frame member(s) 102 and/or the truss 111 can be compensated for by angular displacements of the swing-link attachments 222. As a result, the truss 110 can be assembled outside of the aircraft 100 during assembly of the aircraft 100. Moreover, the systems that are attached can be installed on the truss 110 before the truss is moved into the aircraft. As a result, a nearly-finished truss 110 can be moved into the aircraft 100 and quickly attached to the circumferential frame member(s) 102. Furthermore, the already-installed systems on the truss 110 are ready to be connected to other systems or portions of the systems already installed in the aircraft. As a result, the duration of time to install a truss 110 and systems in the aircraft 100 can be reduced.

Figure 7:
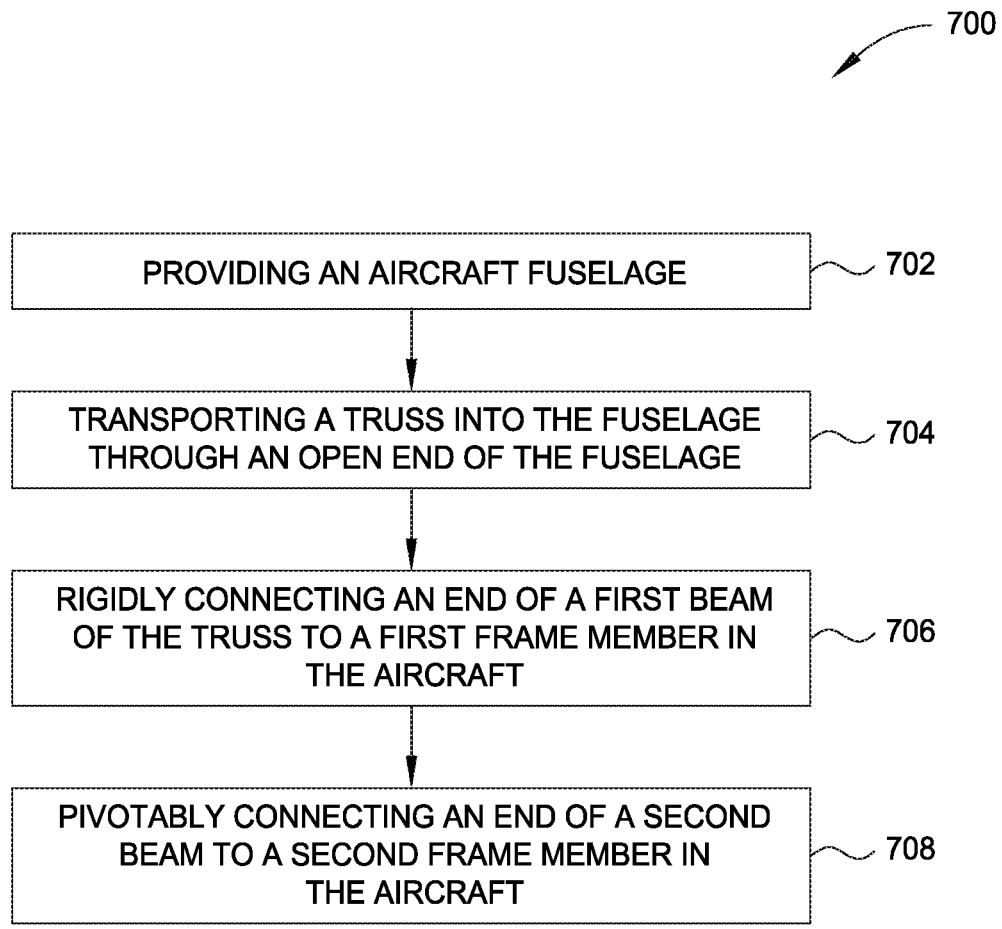
FIG. 7 is a flow chart illustrating a method, according to one aspect, for assembling a truss in an aircraft.

FIG. 7 is a flow chart for a method 700 for installing a truss 110 in an aircraft 100. In block 702 of the method 700, an aircraft fuselage is provided. The provided aircraft fuselage at least includes circumferential frame member(s) 102. The nose or the tail of the aircraft is not yet assembled onto the provided aircraft at this stage. In block 704, a pre-assembled truss 110 is transported into the fuselage through the open nose or tail. As discussed above, the truss 110 may be transported into the fuselage with various systems (e.g., wire harnesses 112, electrical equipment 114, ECS ducts 116, and various other systems 118 and 120) already installed. In one aspect, the systems can be installed on the truss 110 when the truss 110 is positioned to allow for ergonomic work conditions. For example, the truss 110 could be set in an assembly jig that allows workers to install the systems at chest level or eye level. In block 706, an end of a first beam of the truss 110 is rigidly connected to a first circumferential frame member 102 of the aircraft 100 via a fixed rod end attachment (e.g., a fixed rod end attachment 220). As discussed above, the fixed rod end attachment locates the truss 110 relative to the circumferential frame member(s) 102 of the aircraft 100. In block 708, an end of a second beam of the truss 110 is pivotably connected to a second circumferential frame member 102 of the aircraft 100 via a swing-link attachment (e.g., a swing-link attachment 222). As discussed above, the swing-link attachment allows the second beam of the truss to move relative to the circumferential frame member 102. Optionally, additional beams of the truss 110 are connected to additional circumferential frame members via additional swing-link attachments. In the above-described method 700, the truss 110 is installed in the aircraft 100 simply by coupling the fixed rod end attachment(s) 220 and swing-link attachments 222 to circumferential frame member(s) 102 of the aircraft 100 (e.g., via fasteners 520 and 330, respectively). As a result, the duration of time to install the truss 110 in the aircraft 100 can be greatly reduced. By reducing the duration of time to install the truss 110 in the aircraft 100, aircraft assembly time can be devoted to other assembly tasks.

The aspects described herein are related to a truss installed in an aircraft. In various other aspects, the truss could be installed in other types of vehicles, such as a bus, a train, a ship, or a boat. In various other aspects, the truss could be installed in another structure, such as a building.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to certain aspects, other and further aspects may be devised without departing from the basic scope thereof, and the scope thereof is determined by the claims that follow.

What is claimed is:

1. A method, comprising:
providing an aircraft fuselage that comprises a first frame member and a second frame member, wherein the first and second frame member are spaced apart along a longitudinal axis, and wherein the aircraft fuselage includes an open end;
transporting a truss into the fuselage through the open end of the fuselage, the truss comprising:
a first member and a second member oriented along the longitudinal axis, wherein the first member is spaced apart from the second member in a first lateral direction relative to the longitudinal axis;
a first beam attached to the first member and the second member at a first longitudinal position along the longitudinal axis and oriented along the first lateral direction relative to the longitudinal direction, wherein the first beam includes a first end extending past the first member in the first lateral direction away from the second member;
a second beam attached to the first member and the second member at a second longitudinal position along the longitudinal axis and oriented along the first lateral direction, wherein the second beam includes a second end extending past the first member in the first lateral direction away from the second member; and
aircraft systems equipment coupled to at least one of the first member, the second member, the first beam, and the second beam, wherein the aircraft systems equipment comprises at least one of ducts, wiring bundles, and equipment boxes;
rigidly connecting the first end of the first beam to the first frame member with a first fixed rod end; and
pivotably connecting the second end of the second beam to the second frame member of the fuselage with a first swing-link attachment, wherein the first swing-link attachment allows relative movement between the second end of the second beam and the second frame member in the direction of the longitudinal axis.

2. The method of claim 1, wherein the truss further comprises:
a third member oriented along the longitudinal axis, wherein the third member is spaced apart from the second member in a second lateral direction relative to the longitudinal axis;
a third beam attached to the second member and the third member at the first longitudinal position along the longitudinal axis and oriented along the second lateral direction, wherein the third beam includes a third end extending past the third member in the second lateral direction away from the second member;
a fourth beam attached to the second member and the third member at the second longitudinal position along the longitudinal axis and oriented along the second lateral direction, wherein the fourth beam includes a fourth end extending past the third member in the second lateral direction away from the second member; and
wherein the method further comprises:
rigidly connecting the third end of the third beam to the first frame member of the aircraft fuselage with a second fixed rod end; and pivotably connecting the fourth end of the fourth beam to the second frame member of the aircraft fuselage with a second swing-link attachment, wherein the second swing-link attachment allows relative movement between the fourth end of the fourth beam and the second frame member in the direction of the longitudinal axis.

3. The method of claim 2, wherein the truss further comprises:
a fifth beam attached to the first member and the second member at a third longitudinal position along the longitudinal axis and oriented along the first lateral direction, wherein the fifth beam includes a fifth end extending past the first member in the first lateral direction away from the second member;
a sixth beam attached to the second member and the third member at the third longitudinal position along the longitudinal axis and oriented along the second lateral direction, wherein the sixth beam includes a sixth end extending past the third member in the second lateral direction away from the second member;
a third swing-link attachment pivotably connected to the fifth end of the fifth beam, wherein the third swing-link attachment is configured for attachment to a third frame member of the aircraft fuselage and allows relative movement between the fifth end of the fifth beam and the third frame member in the direction of the longitudinal axis; and
a fourth swing-link attachment pivotably connected to the sixth end of the sixth beam, wherein the fourth swing-link attachment is configured for attachment to the third frame member of the aircraft fuselage and allows relative movement between the sixth end of the sixth beam and the third frame member in the direction of the longitudinal axis.

4. The method of claim 2, wherein the truss further comprises a diagonal member that includes a first end and a second end, wherein the first end of the diagonal member is coupled to the second member between the third beam and the fourth beam, and wherein the second end of the diagonal member is coupled to the third member between the third beam and the fourth beam, and wherein the diagonal member forms non-orthogonal and non-parallel angles with the second member and the third member.

5. The method of claim 2, wherein the truss further comprises:
a first diagonal member that includes a first end and a second end, wherein the first end of the first diagonal member is coupled to the first member between the first beam and the second beam, and wherein the second end of the first diagonal member is coupled to the second member between the first beam and the second beam, and wherein the first diagonal member forms non-orthogonal and non-parallel angles with the first member and the second member; and
a second diagonal member that includes a third end and a fourth end, wherein the third end of the second diagonal member is coupled to the second member between the third beam and the fourth beam, and wherein the fourth end of the second diagonal member is coupled to the third member between the third beam and the fourth beam, and wherein the second diagonal member forms non-orthogonal and non-parallel angles with the second member and the third member.

6. The method of claim 2, wherein the first lateral direction is orthogonal to the second lateral direction.

7. The method of claim 1, wherein the first swing-link attachment is connected to the second end of the second beam via a monoball bearing.

8. The method of claim 1, wherein the truss further comprises:
a third beam attached to the first member and the second member at a third longitudinal position along the longitudinal axis and oriented along the first lateral direction relative to the longitudinal axis, wherein the third beam includes a third end extending past the first member in the first lateral direction away from the second member; and
a second swing-link attachment pivotably connected to the third end of the third beam, wherein the second swing-link attachment is configured for attachment to a third frame member of the aircraft fuselage and allows relative movement between the third end of the third beam and the third frame member in the direction of the longitudinal axis.

9. The method of claim 1, wherein the truss further comprises a strut comprising a first end and a second end, wherein the first end of the strut is attached to an end of the second member, and wherein the second end of the strut is configured for attachment to another frame member of the aircraft fuselage.

10. The method of claim 1, wherein the truss further comprises a diagonal member that includes a first end and a second end, wherein the first end of the diagonal member is coupled to the first member between the first beam and the second beam, and wherein the second end of the diagonal member is coupled to the second member between the first beam and the second beam, and wherein the diagonal member forms non-orthogonal and non-parallel angles with the first member and the second member.

11. A method, comprising:
providing a fuselage of an aircraft, the fuselage having an open end;
transporting a truss into the fuselage through the open end;
rigidly connecting a first end of a first beam of the truss to a first frame member in the aircraft; and
pivotably connecting a second end of a second beam of the truss to a second frame member in the aircraft.

12. The method of claim 11, wherein the first frame member and the second frame member are oriented along a circumferential frame member of the fuselage, wherein the first frame member is spaced apart from the second frame member along a longitudinal axis.

13. The method of claim 12, wherein the first beam is attached to the first frame member at a first longitudinal position along the longitudinal axis and is oriented along a first lateral direction relative to the longitudinal axis, wherein the first end of the first beam extends past the first member in the first lateral direction away from the second member.

14. The method of claim 13, wherein the second beam is attached to the second frame member at a second longitudinal position along the longitudinal axis and is oriented along the first lateral direction, wherein the second end of the second beam extends past the first member in the first lateral direction away from the second member.

15. The method of claim 12, further comprising:
rigidly connecting a third end of a third beam of the truss to a third frame member in the aircraft that is oriented along the circumferential frame member of the fuselage, wherein the third frame member is spaced apart from the second frame member along the longitudinal axis; and pivotably connecting a fourth end of a fourth beam of the truss to the fourth frame member in the aircraft.

16. The method of claim 15, wherein a first lateral direction is orthogonal to a second lateral direction.

17. The method of claim 12, wherein the second frame member is pivotably connected to the second beam via a first swing-link attachment, wherein the first swing-link attachment allows relative movement between the second end of the second beam and the second frame member in a direction of the longitudinal axis.

18. The method of claim 17, wherein the first swing-link attachment is connected to the second end of the second beam via a monoball bearing.

19. The method of claim 11, further comprising: coupling aircraft systems equipment to at least one of the first frame member, the second frame member, the first beam, and the second beam, wherein the aircraft systems equipment comprises at least one of ducts, wiring bundles, and equipment boxes.

20. The method of claim 11, further comprising:
coupling a first end a first diagonal member of the truss to the first frame member between the first beam and the second beam; and
coupling a second end of the first diagonal member to the second frame member between the first beam and the second beam, wherein the first diagonal member forms non-orthogonal and non-parallel angles with the first frame member and the second frame member.

* * * * *